UNITED STATES PATENT OFFICE.

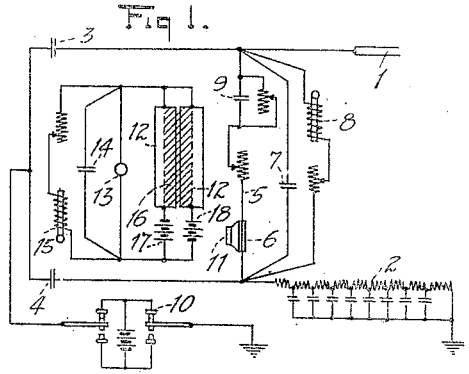

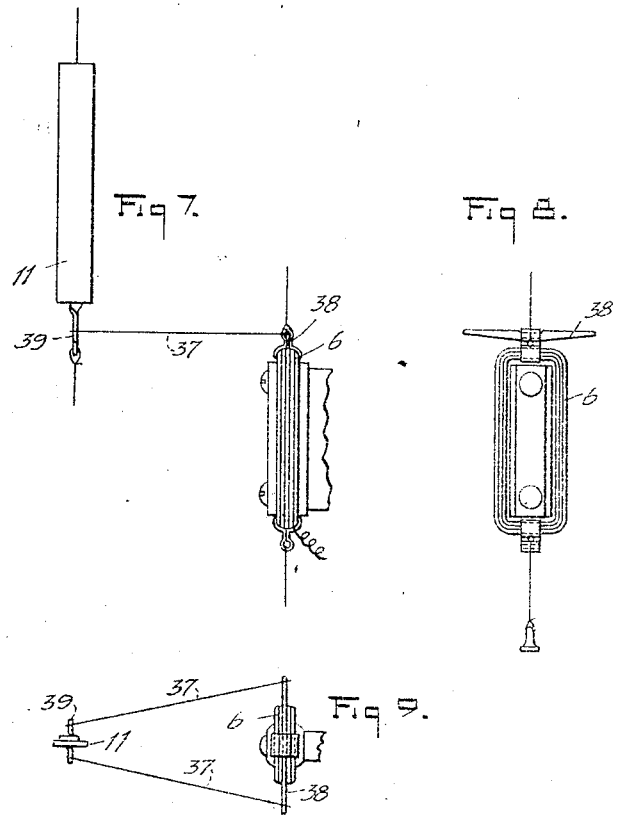

THOMAS BULLITT DIXON, OF NEW YORK, N. Y.

TELEGRAPH AND LIKE SIGNALING SYSTEM.

1,323,581. Specification of Letters Patent. Patented Dec. 2, 1919.

Continuation of application Serial No. 40,694, filed July 19, 1915. Patent No. 1,193,999. This application filed February 9, 1916. Serial No. 77,155.

*To all whom it may concern:*

Be it known that I, THOMAS B. DIXON, a citizen of the United States of America, and a resident of New York, county of New York, and State of New York, have invented certain new and useful Improvements in Telegraph and like Signaling Systems, of which the following is a specification.

My invention relates to telegraph and like signaling systems, and particularly to submarine or cable telegraph systems, and comprises a method of and means whereby the disturbing and signal-distorting effects, experienced in transmission through long cable lines, are counter-balanced, and whereby a condenser of greater capacity, than has been practicable heretofore, may be employed in shunt relation with respect to the coil of the receiving galvanometer or other primary receiving instrument, and whereby the cable circuit may be balanced for duplex operation more readily than heretofore.

In the high speed duplex operation of submarine cable circuits much difficulty has been experienced heretofore, due to the difficulty of obtaining a sufficiently close balance between the main and artificial lines, and also to inductive disturbances, and earth currents (particularly in the shore end connections). Various means have been employed heretofore for reducing such difficulties, such as the shunting of the receiving instrument by condensers, and by inductive resistances (which are commonly termed, in this sense, "magnetic shunts"). So far as I am aware, none of these arrangements have proved highly successful, one reason being, that if the capacity of the shunting condenser or condensers be sufficiently high to obviate the harmful effects of the disturbances mentioned, there is a tendency to distortion of the signals manifesting itself chiefly in the form of an overthrow beyond the zero line. For this reason it has not been practicable heretofore to employ condensers of sufficiently large capacity shunted around the receiving instrument to eliminate to the desired degree disturbances due to the causes mentioned.

It has been found convenient to use, in connection with primary cable receiving apparatus, so-called "magnifiers" constituting secondary receiving instruments, themselves operated by the primary receiving instruments; which magnifiers magnify the signals of the primary receiving instrument and thereby not only make the signals more legible, but permit a higher speed of operation. I have found that when such a magnifier, (and particularly a magnifier such as hereinafter described, and of my invention) has capacity of proper value, and preferably both capacity and inductance, each of proper value, shunted around it, the former harmful effects of shunted capacity of high value employed in connection with the primary receiving instrument, are obviated; in other words, I have found that the capacity, or both capacity and inductance, shunted around the secondary receiving instrument, neutralize, as to the secondary receiving instrument, the otherwise disturbing "overthrow" effect of the high value capacity shunted around the primary receiving instrument. By the use of capacity, or capacity and inductive resistance, shunted around the secondary receiving instrument, and particularly around a secondary receiving instrument or magnifier of the type herein described, it is thus possible to use capacity, shunted around the primary receiving instrument, of very much higher value than it is practicable to use otherwise; and indeed by this means a very satisfactory working balance can be obtained, for high speed operation, under conditions which would substantially preclude the obtaining of a working balance otherwise. In addition, the capacity and inductive resistance so shunted around the secondary receiving instrument tend to eliminate any remaining disturbances not eliminated by the condenser, or condenser and inductive resistance, in shunt relation with respect to the primary receiving instrument.

The magnifier or secondary receiving instrument in connection with which shunted capacity, or capacity and inductance, is employed, as above mentioned, preferably comprises one or more selenium cells or equivalent radio-electro-sensitive devices; the primary signal receiving device being provided with a reflector or mirror operated by the moving element of the primary receiving instrument referred to, such reflector or mirror arranged to reflect a beam of light variably across the surface or surfaces of the selenium cell or cells or equivalent device employed as aforesaid; such selenium cell or cells or equivalent device being located in a circuit influencing a siphon recorder or other suitable instrument constituting the final receiving or recording or retransmitting element. The beam of light so reflected variably, in the normal or rest position preferably illuminates a portion only of the selenium cell or equivalent device; or, if two or more such cells or equivalent devices are employed, such beam of light in the normal position illuminates part only of each such cell or equivalent device; movement of the beam of light either increasing or decreasing the illumination of such selenium cell or other device, and thereby varying its resistance or other electrical effect, and so producing a variation in the current which actuates the siphon recorder or other receiving, recording or retransmitting apparatus.

In the accompanying drawings I illustrate more or less diagrammatically various arrangements embodying my said invention.

In said drawings:

Figure 1 is a diagram showing the galvanometer which operates the said reflector located in the cross wire of the well known Wheatstone bridge arrangement of receiving circuits and instruments, the view also indicating the reflector, the selenium cells, and the receiving instrument operated by those cells.

Fig. 2 is a similar view showing the coil of the said galvanometer located in the cross wire of a secondary Wheatstone bridge, itself constituting the cross wire of a primary Wheatstone bridge; the receiving instrument operated by the selenium cells being also shown in the cross wire of a further Wheatstone bridge.

Fig. 3 is a diagram showing what is known as the "magnetic bridge arrangement," the said galvanometer coil being bridged across between the main and artificial lines.

Fig. 4 is a diagram similar to Fig. 1, but illustrating an alternative or preferred arrangement of the capacity in shunt relation with respect to the primary receiving instrument.

Fig. 5 is a diagrammatic view showing two opposing galvanometer coils mounted in a magnetic field and connected to associated selenium cells in such manner that as the illumination of one cell decreases and the illumination of the other cell increases, deflection of the coils will result; capacity and inductive resistance being also shown in shunt with respect to each of these two coils.

Fig. 6 is a diagrammatic view illustrating the use of my apparatus for one-way transmission.

Fig. 7 is a diagrammatic side elevation of the galvanometer coil, its reflector, and the traces connecting the galvanometer coil and the reflector.

Fig. 8 shows a front elevation of the said galvanometer coil.

Fig. 9 shows a top view of the galvanometer coil and reflector.

Referring first to Fig. 1: 1 indicates the incoming cable end, 2 the artificial line, 3 and 4 condensers commonly provided in the main and artificial line, 5 the cross wire of the Wheatstone bridge wherein the coil 6 of the receiving galvanometer is located, and 7 designates capacity (a condenser or condensers) shunted around that galvanometer coil 6, while 8 designates inductive resistance, also shunted around the coil 6. 9 designates the usual receiving shunted condenser in the cross wire of the bridge. Suitable regulating non-inductive resistances are provided, as is customary. 10 designates the usual transmitting apparatus connected to the apex of the bridge. 11 designates the reflector actuated by the galvanometer coil 6. 12, 12 designate selenium cells to be actuated by a light pencil or pencils projected upon them by the reflector 11 and caused to sweep across them by the movements of that reflector, as mentioned above. 13 designates diagrammatically the receiving instrument operated by the selenium cell circuits (such receiving instrument being customarily a siphon recorder though it may be some other suitable type of receiving instrument); 14 designates capacity (a condenser or condensers) shunted around this receiving instrument 13, and 15 designates inductive resistance likewise shunted around this receiving instrument.

For convenience in arranging the various instruments in the diagram, the reflector 11 is not shown directly opposite the selenium cells 12; but it will be understood that in practice it will be so arranged as to reflect a light beam from some suitable source upon those selenium cells. I have indicated by hatching, on the faces of those selenium cells, a light beam 16, in what may be considered the normal or rest position, such light beam illuminating both selenium cells partly, and illuminating neither cell completely. It will be apparent that deflection of the light beam in either direction will increase the illumination of one selenium cell, and decrease the illumination of the other selenium cell. The two selenium cells are shown in multiple branches of the circuit of the receiving instrument 13, with batteries 17 and 18 of opposite polarity, relatively, in such multiple branches. It will be apparent that with selenium cells 12 of equal resistance, and with the light beam 16 illuminating equal areas of both cells, the two batteries of said two cells neutralize each other; but that with any movement of the light beam 16 from the position shown, with corresponding decreased resistance of one selenium cell, and increased resistance of the other selenium cell, due to the changed illumination of those cells consequent upon the movement of the light beam, there will be a current variation through the receiving instrument 13 substantially equal to twice the current variation which will occur if only one of the selenium cells 12 and its corresponding battery were employed; the action of the selenium cells being cumulative.

I have found that by giving proper value to the capacity 14 (which value depends upon conditions of each particular installation and upon conditions which may vary from time to time, such value being therefore determined for each particular installation, from time to time, by trial and test, the value of capacity 14 being, in many cases, considerably greater than that of capacity 7) a much higher value can be given to the capacity 7 than has been practicable heretofore, and thereby disturbances such as are due to imperfect balance of the artificial line with respect to the main line, and to induction, earth currents, etc., are neutralized to such an extent that, whereas without the capacity 14, the signals would be unreadable even at quite low speeds, yet with the capacity 14 together with a capacity 7 of the proper value, and an inductive resistance 8 of proper value, perfect signals may be produced at very high speeds; in fact, the disturbances mentioned are for all practical purposes eliminated.

Various arrangements of receiving circuits and apparatus are known and commonly employed in connection with submarine cables. Therefore I have thought it better to illustrate my present invention (comprising capacity and inductive resistance shunted around the receiving instrument in connection with high capacity and inductive resistance shunted around the coil of the receiving galvanometer or other primary receiving instrument) in connection with two other typical receiving circuit arrangements. Of course these three typical circuit arrangements which are illustrated in Figs. 1, 2 and 3 are not all the possible or known arrangements of receiving circuits; but to illustrate my invention in connection with all known or possible arrangements of receiving circuits would be burdensome, and I believe that from the illustration of my invention in connection with three typical receiving circuit arrangements the principles of my invention will be made clear to those skilled in the art, and the applicability of my invention to still other receiving circuit arrangements will be made clear.

In the arrangement shown in Fig. 2 the coil 6 of the receiving galvanometer is located within a secondary Wheatstone bridge comprising arms 19, 20, 21 and 22, and a cross wire 23, arms 19 and 22 containing capacity, and arms 20 and 21 containing non-inductive resistance, and the cross wire also containing resistance, there being an inductive shunt 24 around the coil 6 in this cross wire; there also being a shunted condenser 25 in series with the secondary bridge. I have shown the receiving instrument 13 of the selenium cell circuits in another Wheatstone bridge, comprising arms 26, 27, 28 and 29, and a cross wire 30, there being capacity in arms 26 and 29, and there being non-inductive resistance in arms 27 and 28; and there being a magnetic shunt 31 around the receiving instrument 13. In this case also the capacity and inductance of the selenium cell circuits of the instrument 13 coact with the capacity and inductance employed in connection with the line coil 6, to neutralize the disturbing effects mentioned and distortion of signals. The selenium cell circuits of Figs. 1 and 2 (by the selenium cell circuits I mean not only the circuit branches through the selenium cells themselves, but also the continuations of those circuits comprising in Fig. 1, the receiving instrument 13, the shunted condenser 14, and the inductive shunt 15, and comprising in Fig. 2 the third Wheatstone bridge and the receiving instrument 13, and its magnetic shunt 31) may be interchanged, since either selenium cell circuit arrangement of these two figures is equally suitable for use with the line instrument circuits shown in both of these figures.

In Fig. 3 I have shown what is known as the "magnetic bridge" arrangement wherein the receiving coil 6 is bridged across between the main line and artificial line and is shunted by capacity 7, the line and artificial line passing through opposing inductive resistance coils 32 and 33. I have shown in this figure the same selenium cell circuits as in Fig. 1, but the selenium cell circuits of Fig. 2 are equally suitable for the arrangement shown in Fig. 3.

The arrangement shown in Fig. 4 is similar to that shown in Fig. 1 except that the condenser 7 is in shunt with respect to the coil 6 only, instead of being in shunt also with the condenser 9 and the resistance in the cross wire 5 of the bridge. I have found that it is preferable in most cases to have the condenser 7 in shunt with the coil 6 only, as shown in Fig. 4.

Instead of controlling the instrument 13 by the opposing potential means shown in Figs. 1–4 inclusive, other means may be employed. For example, in Fig. 5, I have shown an arrangement wherein two mechanically connected coils 34 are provided, each being located in the magnetic field produced by magnet poles 34$^a$ and each coil having as usual an internal core 34$^b$; the coils being mechanically connected and mounted to move together. One of the selenium cells 12 is connected to one of these coils 34, the other selenium cell being connected to the other coil 34. The coils are to be understood as wound oppositely, so that current of the same direction flowing through both coils causes them to oppose each other as to rotation. It will be apparent that, supposing the two coils to be perfectly balanced, one against the other, with the light beam 16 in some definite position, movement of that light beam from such position will increase the illumination of one of the selenium cells and will decrease correspondingly the illumination of the other selenium cell, so decreasing flow through one of the opposing coils 34, and increasing the flow through the other of the two opposing coils 34 and so causing deflection of those coils. The arrangement shown in Fig. 5 has the advantage that neither coil has any noticeable electrostatic influence on the other, whereas, in the case of differentially wound coils, each winding of the differential coil has an electrostatic influence upon the other coil. The construction is also very simple and the connections easily made. There is considerable difficulty in properly winding small differential coils, such as galvanometer coils, whereas there is no corresponding difficulty in properly winding individual separate coils such as are employed in Fig. 5.

Obviously the apparatus above described is applicable for reception of signals on lines operated in one direction only, and in which therefore, there is no occasion for use of an artificial line and for obtaining a balance between the main line and the artificial line. Fig. 6 shows my apparatus arranged for reception of signals on a line operated in one direction only; the arrangement being similar to that shown in Fig. 4 and requiring no detailed description in view of the description already given with reference to Figs. 1 and 4. In reception of signals on lines operated in one direction only, my apparatus herein described has the same advantages as to correcting distortion or overthrow due to high capacity employed in connection with the primary receiving apparatus as it has in the arrangements above described for duplex working. Also, in one direction working my apparatus gives a much higher working margin than is given by any other signal receiving apparatus known to me. For these two reasons, a much higher speed of operation is obtainable in one direction working, as well as in duplex working.

In order that the relation of the receiving galvanometer coil 6 with reference to its reflector 11 may be evident from the drawings attached to this specification I have shown such arrangement diagrammatically in Figs. 7, 8 and 9; the coil 6 having a fiber suspension, the reflector 11 having also a fiber suspension, the coil and the reflector being connected by traces 37, these traces being connected to the coil 6 by a spreader 38 of greater length than the spreader 39 which connects said traces to the reflector; the result being that the angular movements of the reflector 11 are very much greater than the corresponding angular movements of the coil 6.

It has been suggested heretofore to employ inductive resistance in connection with selenium cells, to overcome the lag or inertia of those cells. It should be understood that in arrangements such as shown in Figs. 1–6 inclusive the inductive resistance employed in shunt relation to the instrument operated by the selenium cells has no relation whatever to any lag or inertia of such selenium cells; there being no lag when the illumination of the selenium cells is sufficiently intense, as explained hereafter: but the action of such inductive resistance, and the action of the condenser 14 also in shunt relation to both the inductive resistance and the selenium cells, mutually modify each other to the end that, together, when properly adjusted, they overcome the effects of signal distortion due to high capacity and inductance in shunt relation to the receiving galvanometer coil 6. This I have determined in actual practice; and, without limiting myself to any particular theory as to such interaction, the probable explanation is as follows (reference being made to Fig. 1, though the action in the other figures is similar): Supposing a current wave to come in through the line cable circuit 1. This causes a flow of current through the receiving galvanometer coil 6 and also causes condenser 7 and inductive resistance 8 to charge. The resulting movement of the coil 6 causes the beam of light playing upon selenium cells 12 to move, thereby causing flow of current through secondary receiving instrument 13 and causing condenser 14 and inductive resistance 15 to charge. As this charging (i. e., magnetization of the core) of the inductive resistance 8 increases, the resistance (at first very high) which that inductive resistance offers to the flow of current through it, decreases, and consequently the flow of current through it increases. The same is true of inductive resistance 15, but that inductive resistance 15 is in series with an ohmic resistance of much higher value than the ohmic resistance in series with inductive resistance 8; consequently, inductive resistance 15 charges, and the resistance which it offers to the flow of current decreases, at a much slower relative rate than is true of inductive resistance 8.

As the cable current dies down the condenser 7 begins to discharge both through the coil 6 and through the inductive resistance 8 in the same direction as that of the cable current, the inductive resistance 8 now offering relatively small opposition to the flow of the discharge current of condenser 7, since the core of that inductive resistance 8 is now well magnetized. As the discharge of condenser 7 decreases the inductive resistance 8 discharges, such discharge taking place through the coil 6, in a direction opposite to that of the cable current so as to tend to cause that coil to return or swing back toward the zero position, and the higher the capacity value of condenser 7 the greater will be the current flow through inductive resistance 8 and the resultant discharge of that inductive resistance tending to return the coil 6 to, or beyond, zero; from which may be seen why the overthrow of a coil such as 6 may result, as is observed when capacity beyond a certain value is used in shunt relation to the coil. The condenser 14, discharging through secondary receiving instrument 13 and inductive resistance 15 in parallel, discharges through its receiving instrument 13 following the discharge of inductive resistance 8 through coil 6 as before stated; and the condenser 14 discharges through its instrument 13 at a considerable rate, though also discharging through its inductive resistance 15, owing to the fact that the magnetization of the core of inductive resistance 15 has not yet risen to the same relative degree of saturation as did the core of inductive resistance 8 prior to the discharge of that inductive resistance 8 as above stated; the relatively slower rise of magnetization of the core of inductive resistance 15 being due to the relatively high ohmic resistance in series with that inductive resistance. The discharge from condenser 14 is in a direction tending to hold the coil 34 of instrument 13 against return, and thus this discharge of condenser 14 through instrument 13 tends to neutralize the overthrow of coil 6 so far as the recording or reproduction of signals by instrument 13 is concerned.

By proper adjustment of the capacity of condenser 14, of the inductance of inductive resistance 15, and of the resistance of the ohmic resistance in series with inductive resistance 15, any desired compensation for the effect of high capacity 7 in shunt with coil 6 may be obtained.

The radio-electro-sensitive devices employed as above described are not necessarily selenium cells; they may be actinium cells, actinium having a relatively low resistance in darkness and a relatively high resistance when brightly illuminated; also thermal couples or thermo-piles may be used, since such devices will generate current variably if acted upon variably by heat rays, and heat rays may be reflected variably just as light rays are reflected variably.

This application is a continuation of my application Serial No. 40,694 filed July 19, 1915, now Patent No. 1,193,999, dated August 8, 1916, wherein is disclosed a method of employing a large number of light beams derived either from a single source or from a plurality of sources, such light beams being concentrated in the first instance upon a primary actuating device reflector, and then being reconcentrated with substantial coincidence upon the radio-electro-sensitive device or devices employed, thereby affording a very intense illumination of such radio-electro-sensitive devices. So far as the so-called "lag effect" of selenium cells is concerned, which lag effect has been referred to hereinbefore, my experience is that when the illumination of the radio-electro-sensitive devices is sufficiently intense, as is the case when the multiple light beam arrangement of my said prior application is employed, there is no observable lag, and therefore no need of compensation for lag by inductive resistance in shunt relation to the receiving instrument operated by the radio-electro-sensitive devices.

What I claim is:

1. In a telegraph system such as described the combination with a main line, an artificial line, and signal receiving and transmitting circuits therefor comprising a receiving instrument comprising an actuating coil and a reflector which that coil actuates, and capacity in shunt relation with respect to such coil, of one or more radio-electro-sensitive devices arranged to be acted upon by a beam of radiant energy caused to move across the surface or surfaces of such device or devices by the action of such reflector, a circuit for such device or devices comprising a receiving instrument arranged to be actuated by the variation of such device or devices due to varying action of a beam of radiant energy thereon, and capacity in shunt relation with respect to such receiving instrument.

2. In a telegraph system such as described, the combination with a main line, an artificial line, and signal receiving and transmitting circuits therefor comprising a receiving instrument comprising an actuating coil and a reflector which that coil actuates, and capacity and inductive resistance in shunt relation with respect to such coil, of one or more radio-electro-sensitive devices arranged to be acted upon by a beam of radiant energy caused to move across the surface or surfaces of such device or devices by the action of such reflector, a circuit for such device or devices comprising a receiving instrument arranged to be actuated by the variation of such device or devices due to varying action of a beam of radiant energy thereon, and capacity in shunt relation with respect to such receiving instrument.

3. In a telegraph system such as described, the combination with a main line, an artificial line, and signal receiving and transmitting circuits therefor comprising a receiving instrument comprising an actuating coil and a reflector which that coil actuates, and capacity in shunt relation with respect to such coil, of one or more radio-electro-sensitive devices arranged to be acted upon by a beam of radiant energy caused to move across the surface or surfaces of such device or devices by the action of such reflector, a circuit for such device or devices comprising a receiving instrument arranged to be actuated by the variation of such device or devices due to varying action of a beam of radiant energy thereon, and capacity and inductive resistance in shunt relation with respect to such receiving instrument.

4. In a telegraph system such as described, the combination with a main line, an artificial line, and signal receiving and transmitting circuits therefor comprising a receiving instrument comprising an actuating coil and a reflector which that coil actuates, and capacity and inductive resistance in shunt relation with respect to such coil, of one or more radio-electro-sensitive devices arranged to be acted upon by a beam of radiant energy caused to move across the surface or surfaces of such device or devices by the action of such reflector, a circuit for such device or devices comprising a receiving instrument arranged to be actuated by the variation of the resistance of such cell or cells due to varying action of a beam of radiant energy thereon, and capacity and inductive resistance in shunt relation with respect to such receiving instrument.

5. In a telegraph system such as described, the combination with a main line, an artificial line, and signal receiving and transmitting circuits therefor comprising a primary receiving instrument and a secondary receiving instrument operated by that primary receiving instrument, the primary receiving instrument having capacity in shunt relation with respect to it, the secondary receiving instrument having also capacity in shunt relation with it, the arrangement being such that the capacity in shunt relation with respect to the secondary receiving instrument permits a large capacity in shunt relation with respect to the primary receiving instrument and tends to eliminate disturbances and permits higher speed of operation.

6. In a telegraph system such as described the combination with a main line, an artificial line, and signal receiving and transmitting circuits therefor comprising a primary receiving instrument, and a secondary receiving instrument operated by that primary receiving instrument, the primary receiving instrument having capacity and inductive resistance in shunt relation with respect to it, the secondary receiving instrument having also capacity in shunt relation with it, the arrangement being such that the capacity in shunt relation with respect to the secondary receiving instrument permits a large capacity and an inductive resistance in shunt relation with respect to the primary receiving instrument and tends to eliminate disturbances and permit higher speed of operation.

7. In a telegraph system such as described, the combination with a main line, an artificial line, and signal receiving and transmitting circuits therefor comprising a primary receiving instrument and a secondary receiving instrument operated by that primary receiving instrument, the primary receiving instrument having capacity in shunt relation with respect to it, the secondary receiving instrument having also capacity and inductive resistance in shunt relation with it, the arrangement being such that the capacity and inductive resistance in shunt relation with respect to the secondary receiving instrument permits a large capacity in shunt relation with respect to the primary receiving instrument and tends to eliminate disturbances and permits higher speed of operation.

8. In a telegraph system such as described, the combination with a main line, an artificial line, and signal receiving and transmitting circuits therefor comprising a primary receiving instrument and a secondary receiving instrument operated by that primary receiving instrument, the primary receiving instrument having capacity and inductive resistance in shunt relation with respect to it, the secondary receiving instrument having also capacity and inductive resistance in shunt relation with it, the arrangement being such that the capacity and inductive resistance in shunt relation with respect to the secondary receiving instrument permits a large capacity and an inductive resistance in shunt relation with respect to the primary receiving instrument and tends to eliminate disturbances and permits higher speed of operation.

9. The herein described method of neutralizing signal-distorting effects of high capacity in shunt relation to the primary receiving instrument of a telegraph system such as described, which consists in neutralizing the said signal-distorting effect of high capacity in such shunt relation to the primary signal-receiving instrument by the action of capacity in shunt relation to a secondary receiving instrument operated by that primary receiving instrument, thereby permitting high capacity to be employed in shunt relation with respect to the primary signal-receiving instrument, without accompanying material distortion of signals.

10. The herein described method of neutralizing signal-distorting effects of high capacity and inductance in shunt relation to the primary receiving instrument of a telegraph system such as described, which consists in neutralizing the said signal-distorting effect of high capacity and inductance in such shunt relation to the primary signal-receiving instrument by the action of capacity and inductive resistance in shunt relation to a secondary receiving instrument operated by that primary receiving instrument, thereby permitting high capacity and inductive resistance to be employed in shunt relation with respect to the primary signal-receiving instrument, without accompanying material distortion of signals.

11. The herein described method of neutralizing signal-distorting effects of high capacity and inductance both in shunt relation to the primary receiving instrument of a telegraph system such as described, which consists in neutralizing by the discharge current of capacity in shunt relation to a secondary receiving instrument operated by that primary receiving instrument, the signal-distorting effect of the charge and discharge through the primary receiving instrument of the inductance in shunt relation to that primary receiving instrument.

12. In a telegraph system such as described the combination of a movably mounted coil having two differential windings, two selenium cells connected the one to one such winding the other to the other such winding in such manner that increase of current flow through one such winding and decrease of current flow through the other such winding tend to cause movement of the coil in the same direction, means for moving a beam of light across the surfaces of said cells jointly, and in such manner that as the area of surface illuminated of one such cell increases, the area of the surface illuminated of the other such cell decreases, and capacity in shunt relation to each such winding.

13. In a telegraph system such as described the combination of two movably mounted coils connected to move together and located in a magnetic field, two radio-electro-sensitive devices connected the one to one such winding and the other to the other such winding in such manner that with current flowing in the same direction through both coils said coils oppose one another as to rotation, and means for moving a beam of radiant energy across the surfaces of said radio-electro-sensitive devices jointly in such manner that as the area of surface of one such radio-electro-sensitive device exposed to such beam increases, the area of the other radio-electro-sensitive device so exposed to said beam decreases.

14. In a telegraph system such as described the combination of two movably mounted coils connected to move together and located in a magnetic field, two radio-electro-sensitive devices connected the one to one such winding and the other to the other such winding in such manner that with current flowing in the same direction through both coils said coils oppose one another as to rotation, and means for moving a beam of radiant energy across the surfaces of said radio-electro-sensitive devices jointly in such manner that as the area of surface of one such radio-electro-sensitive device exposed to such beam increases, the area of the other radio-electro-sensitive device so exposed to said beam decreases, and capacity for each coil in shunt relation to such coil.

15. In a telegraph system such as described the combination of two movably mounted coils connected to move together and located in a magnetic field, two radio-electro-sensitive devices connected the one to one such winding and the other to the other such winding in such manner that with current flowing in the same direction through both coils said coils oppose one another as to rotation, and means for moving a beam of radiant energy across the surfaces of said radio-electro-sensitive devices jointly in such manner that as the area of surface of one such radio-electro-sensitive device exposed to such beam increases, the area of the other radio-electro-sensitive device so exposed to said beam decreases, and capacity and inductance for each coil in shunt relation to such coil.

16. In a telegraph system such as described the combination of two movably mounted coils connected to move together and located in a magnetic field, two radio-electro-sensitive devices connected the one to one such winding and the other to the other such winding in such manner that with current flowing in the same direction through both coils said coils oppose one another as to rotation, and means for moving a beam of radiant energy across the surfaces of said radio-electro-sensitive devices jointly in such manner that as the area of surface of one such radio-electro-sensitive device exposed to such beam increases, the area of the other radio-electro-sensitive device so exposed to said beam decreases, and inductance for each coil in shunt relation to such coil.

In testimony whereof I have signed this specification in the presence of two subscribing witnesses.

THOMAS BULLITT DIXON.

Witnesses:
H. M. MARBLE,
PAUL H. FRANKE.